(12) United States Patent
Lindsay

(10) Patent No.: US 9,533,540 B2
(45) Date of Patent: Jan. 3, 2017

(54) PARKING BRAKE INTERLOCK FOR AUTOMATIC LIFT AXLE

(71) Applicant: Hendrickson USA, L.L.C., Itasca, IL (US)

(72) Inventor: Sean Lindsay, Forest Park, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/112,501

(22) PCT Filed: Feb. 24, 2015

(86) PCT No.: PCT/US2015/017214
§ 371 (c)(1),
(2) Date: Jul. 19, 2016

(87) PCT Pub. No.: WO2015/134231
PCT Pub. Date: Sep. 11, 2015

(65) Prior Publication Data
US 2016/0332498 A1 Nov. 17, 2016

Related U.S. Application Data

(60) Provisional application No. 61/947,561, filed on Mar. 4, 2014.

(51) Int. Cl.
*B60G 17/0195* (2006.01)
*B62D 61/12* (2006.01)
*B60T 17/18* (2006.01)

(52) U.S. Cl.
CPC ........... *B60G 17/0195* (2013.01); *B60T 17/18* (2013.01); *B62D 61/12* (2013.01); *B60G 2204/47* (2013.01); *B60G 2400/60* (2013.01)

(58) Field of Classification Search
CPC ............ B60G 17/0195; B60G 2400/60; B60G 2204/47; B62D 61/12; B60T 17/18
See application file for complete search history.

(56) References Cited

U.S. PATENT DOCUMENTS 2,864,454 A 12/1958 La Belle
3,055,678 A 9/1962 Alfieri
(Continued)

FOREIGN PATENT DOCUMENTS

CA 1337492 C 10/1995
DE 2740264 A 3/1979
(Continued)

OTHER PUBLICATIONS

Notification of Transmittal of the International Search Report and the Written Opinion of the International Searching Authority for PCT/US2015/017214, dated Jun. 18, 2015.

*Primary Examiner* — Mary Cheung
(74) *Attorney, Agent, or Firm* — Cook Alex Ltd.

(57) ABSTRACT

An automatic air suspension control system is provided for use in combination with a vehicle having a liftable non-driven rear axle, a driven rear axle, a parking brake, and an air suspension associated with the rear axles to apply a load to the rear axles. The air suspension control system is programmed to determine whether the rear axles are subject to a load condition under which the non-driven rear axle is to be moved between lifted and deployed conditions. If the rear axles are subject to a load condition under which the non-driven rear axle is to be moved, the air suspension control system also determines whether the parking brake is engaged. If the parking brake is disengaged, then the air suspension control system causes the non-driven rear axle to be moved; otherwise, if the parking brake is engaged, then the non-driven rear axle is prevented from moving.

22 Claims, 4 Drawing Sheets

(56) References Cited

U.S. PATENT DOCUMENTS

| | | | |
|---|---|---|---|
| 3,366,399 | A | 1/1968 | Hunger |
| 4,141,430 | A | 2/1979 | Eddy, Jr. |
| 4,944,526 | A | 7/1990 | Eberling |
| 4,993,729 | A | 2/1991 | Payne |
| 5,025,877 | A | 6/1991 | Assh |
| 5,180,185 | A | 1/1993 | Eckert |
| 6,431,557 | B1 | 8/2002 | Terborn |
| 6,550,798 | B2 | 4/2003 | MacKarvich |
| 6,923,453 | B2 | 8/2005 | Pivac |
| 6,966,612 | B2 | 11/2005 | Philpott |
| 7,207,593 | B2 | 4/2007 | Saxon et al. |
| 7,380,799 | B2 | 6/2008 | Niaura |
| 7,661,681 | B1 | 2/2010 | Zork |
| 7,841,608 | B2 | 11/2010 | Morris |
| 7,871,081 | B1 | 1/2011 | Lin |
| 8,360,451 | B2 | 1/2013 | Hammond |
| 8,695,998 | B1 * | 4/2014 | Karel .................. B62D 61/12 |
| | | | 280/86.5 |
| 8,720,938 | B2 | 5/2014 | Ehrlich |
| 8,955,858 | B2 | 2/2015 | Koontz |
| 9,056,537 | B2 | 6/2015 | Eberling |
| 2001/0052685 | A1 | 12/2001 | Svartz |
| 2002/0066605 | A1 | 6/2002 | McClelland |
| 2002/0074746 | A1 | 6/2002 | Eberling et al. |
| 2007/0200304 | A1 | 8/2007 | Brookes |
| 2007/0290461 | A1 | 12/2007 | Oscarsson |
| 2008/0023927 | A1 | 1/2008 | Kim |
| 2009/0206570 | A1 | 8/2009 | Strong |
| 2010/0133771 | A1 | 6/2010 | Hudson |
| 2010/0230913 | A1 | 9/2010 | Peterson |
| 2010/0253032 | A1 * | 10/2010 | Ramsey ................. B60G 5/047 |
| | | | 280/124.162 |
| 2013/0119637 | A1 | 5/2013 | Risse |
| 2013/0140784 | A1 | 6/2013 | Ehrlich |

FOREIGN PATENT DOCUMENTS

| | | |
|---|---|---|
| DE | 3120178 A | 12/1982 |
| DE | 3628681 A | 3/1988 |
| DE | 3815612 A | 11/1989 |
| DE | 3824366 A | 1/1990 |
| DE | 4222922 A1 | 7/1993 |
| DE | 4314994 C1 | 9/1994 |
| DE | 19905113 A1 | 8/2000 |
| DE | 102006011183 A1 | 9/2007 |
| DE | 102010053264 A1 | 6/2012 |
| EP | 0170794 81 | 2/1986 |
| EP | 0284572 A | 9/1988 |
| EP | 0301225 A | 2/1989 |
| EP | 0311527 B1 | 4/1989 |
| EP | 0352426131 | 12/1992 |
| EP | 0416310 B1 | 9/1993 |
| EP | 1571014 B1 | 9/2005 |
| EP | 1571015 A2 | 9/2005 |
| FR | 2238605 | 3/1975 |
| FR | 2281849 A | 4/1976 |
| FR | 2590525 A | 5/1987 |
| GB | 1358920 A | 7/1974 |
| GB | 2081655 A | 2/1982 |
| GB | 2288771 A | 11/1995 |
| WO | WO 00/00360 A1 | 1/2000 |
| WO | WO2005108147 A1 | 11/2005 |
| WO | WO 2006043872 A1 | 4/2006 |
| WO | WO2007050014 A1 | 5/2007 |
| WO | WO 2012002878 A1 | 1/2012 |

* cited by examiner

PARKING BRAKE INTERLOCK FOR AUTOMATIC LIFT AXLE

RELATED APPLICATION

This application is a U.S. national stage application of PCT patent application Ser. No. PCT/US2015/017214, filed Feb. 24, 2015, which claims the benefit of and priority of U.S. Provisional Patent Application Ser. No. 61/947,561, filed Mar. 4, 2014, the contents of which are incorporated by reference herein.

DESCRIPTION

Technical Field

The present disclosure generally relates to vehicle air suspensions. More particularly, the present disclosure relates to control systems for the air suspensions of 6×2 vehicles.

Background

In North America, the majority of semi tractor-trailer combinations with tandem rear axles run in what is known as a 6×4 configuration. This nomenclature designates that six independent wheel positions exist on the tractor (i.e., two for the front axle and two for each of the two rear axles) and that four of those wheel positions are driven to provide propulsion of the vehicle. Typically, this is intended to mean that the four rear wheel positions are driven, with the two front axle wheel positions being non-driven and having the primary purpose of steering the vehicle. Additional configurations exist such as 6×2 (only one of the two rear axles is driven) and 4×2 (a truck with two axles having only one driven axle) configurations, to a lesser degree. The 4×2 configuration is limited by federal bridge laws to only allow a certain total vehicle load, whereas the 6×2 configuration has equal load carrying capability to a 6×4 configuration.

The key advantage of a 6×4 configuration is traction, while the key drawback is reduced fuel economy due to increased parasitic losses from the additional gearset needed to drive the second axle. When fuel prices are low, fleets tend to specify the 6×4 configuration to improve productivity, as fewer trucks will get stuck due to traction problems, especially in inclement weather such as snow and ice. As fuel prices have increased significantly in recent years, fleets are turning to 6×2 configurations as a possible method of improving their overall operating cost of fuel.

6×2 configurations have been widely used in Europe and other parts of the world for many years. To overcome the inherent traction issues, European tractors are equipped with Electronically Controlled Air Suspensions (ECAS), which incorporate a control unit, pressure sensors, wheel speed sensors, and valves with certain control logic to shift load toward the driven axle and away from the non-driven axle when wheel-slip is detected. By increasing load on the driven axle, more tractive effort is attained and the vehicle can move at slow speeds until is able to regain enough traction, at which point the system reverts to its normal operation maintaining a 50/50 load bias between both axles of the tandem. ECAS systems are a standard offering in Europe, however, they have not been used widely in North America due to their added cost and complexity. In North America, when 6×2 configurations have been utilized, a manual "air dump" valve has typically been run to the cab, giving the driver the option to release air from the non-driven axle's suspension when needed, thus transferring load to the driven axle. While simple and low cost, this method allows for operator error, which could inadvertently leave excessive load on the driven axle violating federal bridge laws. In order to be used effectively, this would require additional training and experience for the driver.

Systems have begun to be marketed in North America for a control module for 6×2 configurations that would automate this process, similar to an ECAS system. In all of these cases, the system monitors wheel speed and direction and, upon wheel slip, adjusts air pressure to put more load on the driven axle. Again, once traction is regained and the vehicle returns to normal speeds, the load bias is returned to 50/50 between both axles of the tandem.

Those skilled in the art of tire design, use and wear, will recognize an inherent design short-coming of a 6×2 tractor with 50/50 load bias on the tandem. A key difference between a 6×4 configuration and a 6×2 configuration is that a 6×4 configuration splits the torque transferred from the engine between two driven axles. In the case of a 6×2 configuration, 100% of the drive torque must go through the single driven axle. This increased torque at the same axle load will proportionally increase the longitudinal slip experienced by the tire. Longitudinal slip is a phenomenon that all rubber pneumatic tires experience when rotating to drive a vehicle. It is a slip that occurs in the direction of travel. This slip causes wear of the tire over time and, with the increased torque applied in a 6×2 configuration, will significantly reduce the tire life that fleets experience.

If all vehicles were to drive around fully loaded, increased longitudinal slip would likely not be a significant issue, as the increased wear of the driven axle tires might be offset by the improved wear of the non-driven axle. Rarely, however, is this the case. According to a study by the US Department of Transportation, 53% of loads carried by tractor-trailer combination class 8 vehicles are below 60,000 pounds. Assuming the front steer axle maintains a load of approximately 12,000 pounds, and equal distribution of the remaining load between the other axles, that would put approximately 24,000 pounds each on the tractor and trailer tandems. With 50/50 load bias, the driven axle would be loaded to only around 12,000 pounds of its legal 20,000 pound limit while still taking 100% of the drive torque. Additionally, if the non-driven rear axle is of the type that may be moved between a lifted condition (in which it is spaced some distance above the ground) and a deployed condition (in which it is in contact with the ground), there may be circumstances under which it may be preferable for the non-driven rear axle to not be moved between the lifted and deployed conditions in spite of what the air suspension control system would otherwise dictate. Accordingly, it would be advantageous to provide an air suspension control system that includes an interlock to prevent movement of a liftable non-driven rear axle in certain circumstances.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an automatic air suspension control system is provided for use in combination with a vehicle having a non-driven rear axle configured to be moved between a lifted condition and a deployed condition, a driven rear axle, a parking brake, and an air suspension associated with the rear axles to apply a load to each of the rear axles. The automatic air suspension control system is programmed to command the air suspension to apply load to one or both of the rear axles and to move the non-driven rear axle between the lifted and deployed conditions under selected load conditions, with movement from the lifted condition to the deployed condition being prevented when the parking brake is engaged or movement from the deployed condition to the lifted condition being prevented when the parking brake is engaged.

In another aspect, a vehicle traction control system is provided. The system includes a non-driven rear axle configured to be moved between a lifted condition and a deployed condition, a driven rear axle, a parking brake, an air suspension associated with the rear axles, and an automatic air suspension control system associated with the air suspension. The air suspension control system is programmed to command the air suspension to apply load to one or both of the rear axles and to move the non-driven rear axle between the lifted and deployed conditions under selected load conditions, with movement from the lifted condition to the deployed condition being prevented when the parking brake is engaged or movement from the deployed condition to the lifted condition being prevented when the parking brake is engaged.

In yet another aspect, a method is provided for controlling the traction of a vehicle having a non-driven rear axle configured to be moved between a lifted condition and a deployed condition, a driven rear axle, a parking brake, and an air suspension associated with the rear axles to apply a load to each of the rear axles. The method involves applying load to one or both of the rear axles via the air suspension and determining whether the rear axles are subject to a load condition under which the non-driven rear axle is to be moved from the lifted condition to the deployed condition. If the rear axles are subject to a load condition under which the non-driven axle is to be moved from the lifted condition to the deployed condition and the parking brake is disengaged, then the non-driven rear axle is moved; otherwise, if the parking brake is engaged, then such movement is prevented.

In another aspect, a method is provided for controlling the traction of a vehicle having a non-driven rear axle configured to be moved between a lifted condition and a deployed condition, a driven rear axle, a parking brake, and an air suspension associated with the rear axles to apply a load to each of the rear axles. The method involves applying load to one or both of the rear axles via the air suspension and determining whether the rear axles are subject to a load condition under which the non-driven rear axle is to be moved from the deployed condition to the lifted condition. If the rear axles are subject to a load condition under which the non-driven axle is to be moved from the deployed condition to the lifted condition and the parking brake is disengaged, then the non-driven rear axle is moved; otherwise, if the parking brake is engaged, then such movement is prevented.

DETAILED DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figure 1:
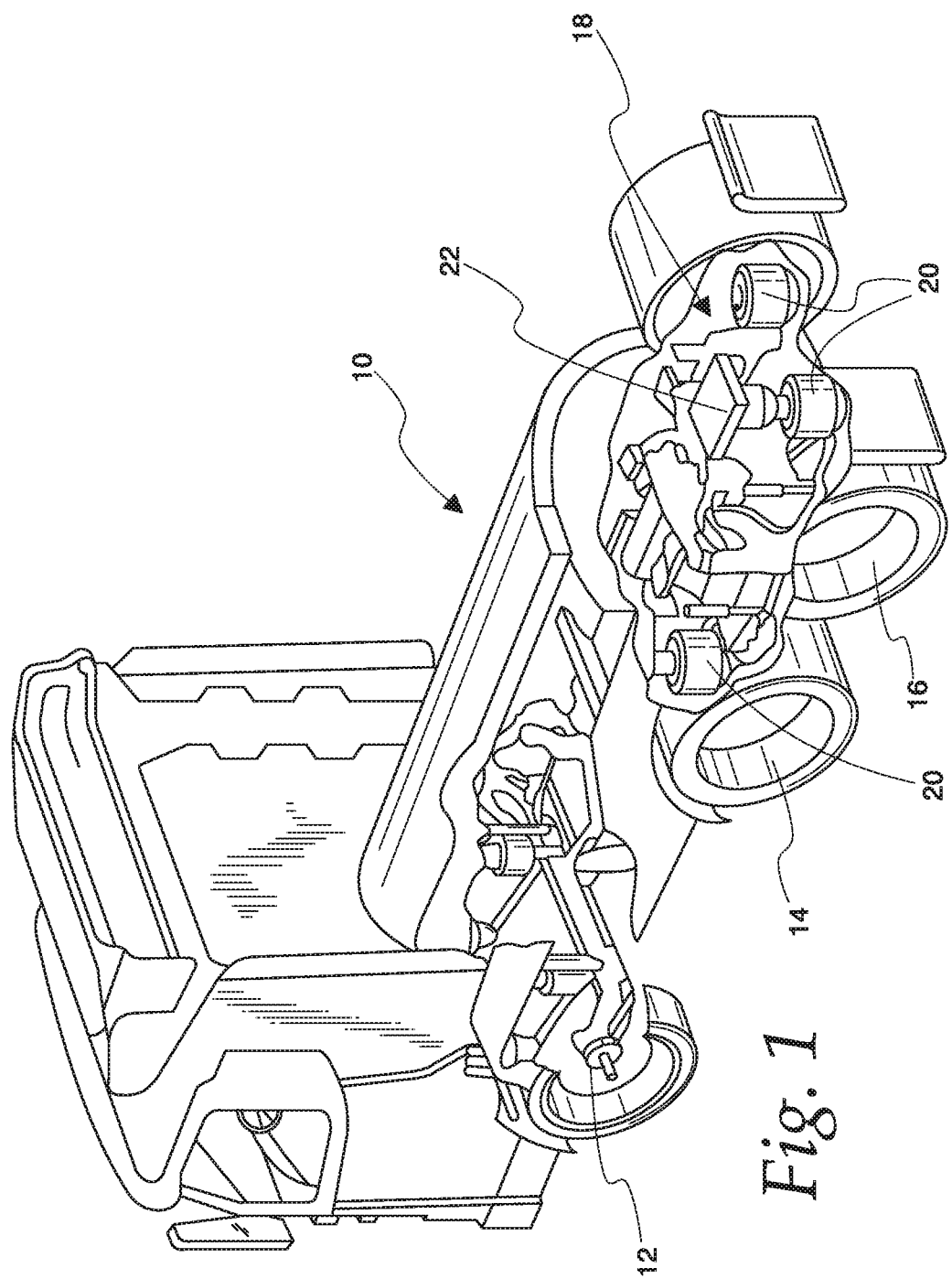
FIG. 1 is a perspective view of a vehicle having an air suspension, with selected portions of the vehicle broken away to better show the air suspension.

FIG. 1 illustrates a vehicle 10 having a front axle 12 and two rear axles 14 and 16. In a preferred embodiment, the vehicle 10 has a 6×2 configuration, with the front axle 12 and one of the rear axles being non-driven and the other rear axle being driven. Preferably, the foremost rear axle 14 is a non-driven pusher axle that may be selectively moved into and out of contact with a ground surface, with the rearmost rear axle 16 being the driven axle. However, it is also within the scope of the present disclosure for the foremost rear axle 14 to be driven and for the rearmost rear axle 16 to be a non-driven tag axle.

The vehicle 10 further includes an air suspension 18 associated with at least the rear axles 14 and 16. The air suspension 18 may comprise a single system that controls both axles 14 and 16 or separate systems for each axle 14, 16 that communicate to jointly control the axles 14 and 16. The air suspension 18 includes one or more ride springs 20 associated with each of the rear axles 14 and 16. The load applied on each rear axle 14, 16 may be varied by adjusting the air pressure in the ride springs 20, and is controlled by an automatic air suspension control system 22, which coordinates with sensors and valves of the air suspension 18 to add air to or vent air from the ride springs 20. The automatic air suspension control system 22 is itself a part of a vehicle traction control system, along with a brake control system, which will be described in greater detail herein.

The non-driven rear axle is liftable, with the air suspension 18 including one or more lift springs 24 (FIG. 2) associated with that axle and configured to move the non-driven rear axle between a lifted condition (in which the non-driven rear axle is spaced above the ground and bears no load) and a deployed condition (in which the non-driven rear axle is lowered and in contact with the ground to bear a load). When a load is to be applied to the non-driven rear axle by the associated ride spring 20, the lift spring 24 is actuated by the air suspension control system 22 (typically by venting air from the lift spring 24 or otherwise decreasing the air pressure in the lift spring 24) to lower the non-driven rear axle into contact with the ground.

The automatic air suspension control system 22 may be variously configured and programmed without departing from the scope of the present disclosure but, in one exemplary embodiment, the automatic air suspension control system 22 is programmed to maintain the loads on the rear axles 14 and 16 at different levels when the vehicle 10 is loaded below a certain level. In particular, at relatively low load levels, the automatic air suspension control system 22 is programmed to maintain a higher load on the driven rear axle than on the non-driven rear axle. Stated differently, the automatic air suspension control system 22 is programmed to bias the loads on the rear axles 14 and 16 of a tandem set in order to maintain a relatively high load on the driven rear axle (up to the maximum legal load) at all times. Such a traction control system provides for the best traction at all times and decreases the longitudinal slip (i.e., tire wear) associated with running a 6×2 configuration.

Figure 2:
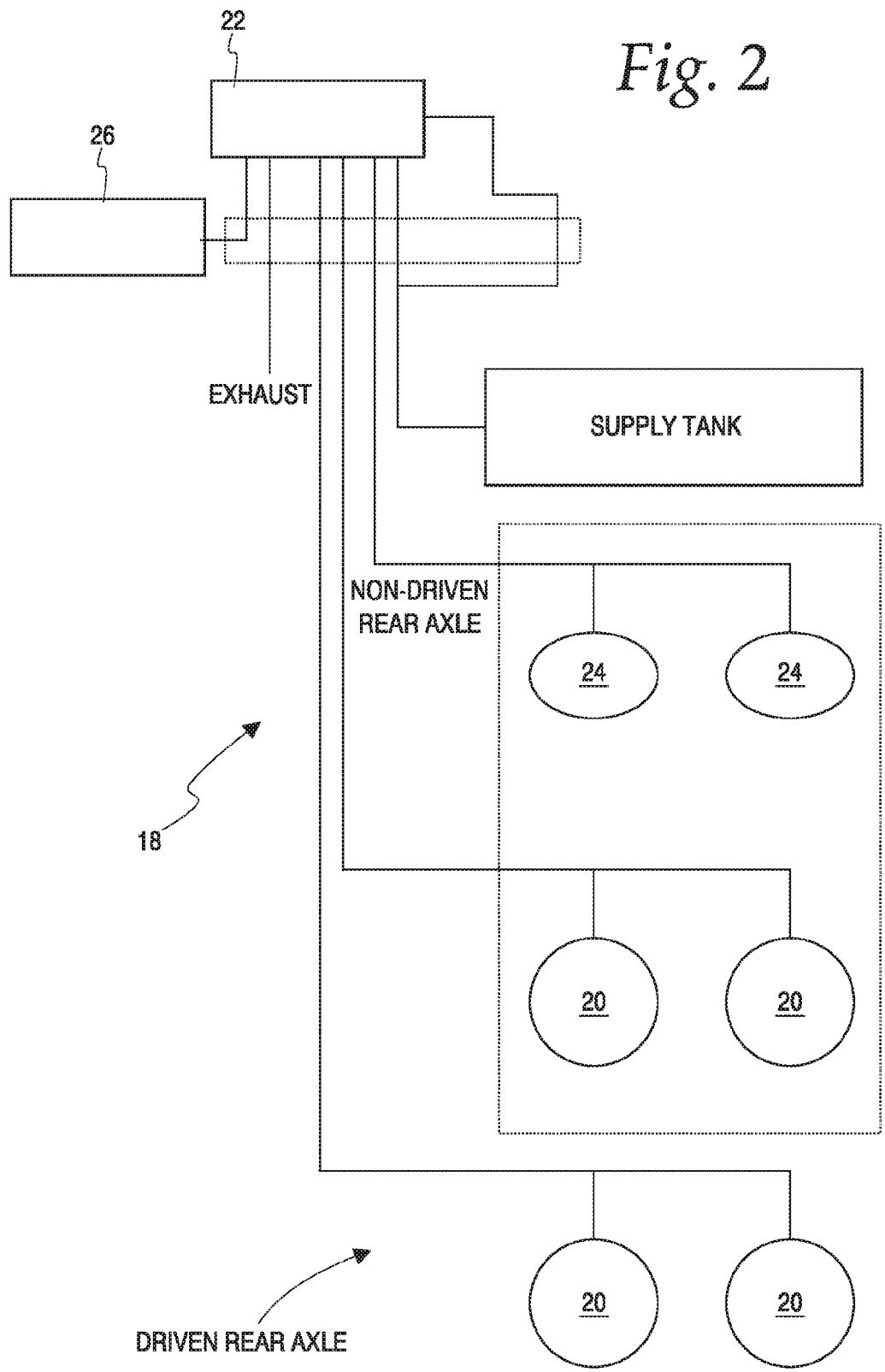
FIG. 2 is a schematic view of a portion of a pneumatic system of a traction control system according to the present disclosure.
Figure 3:
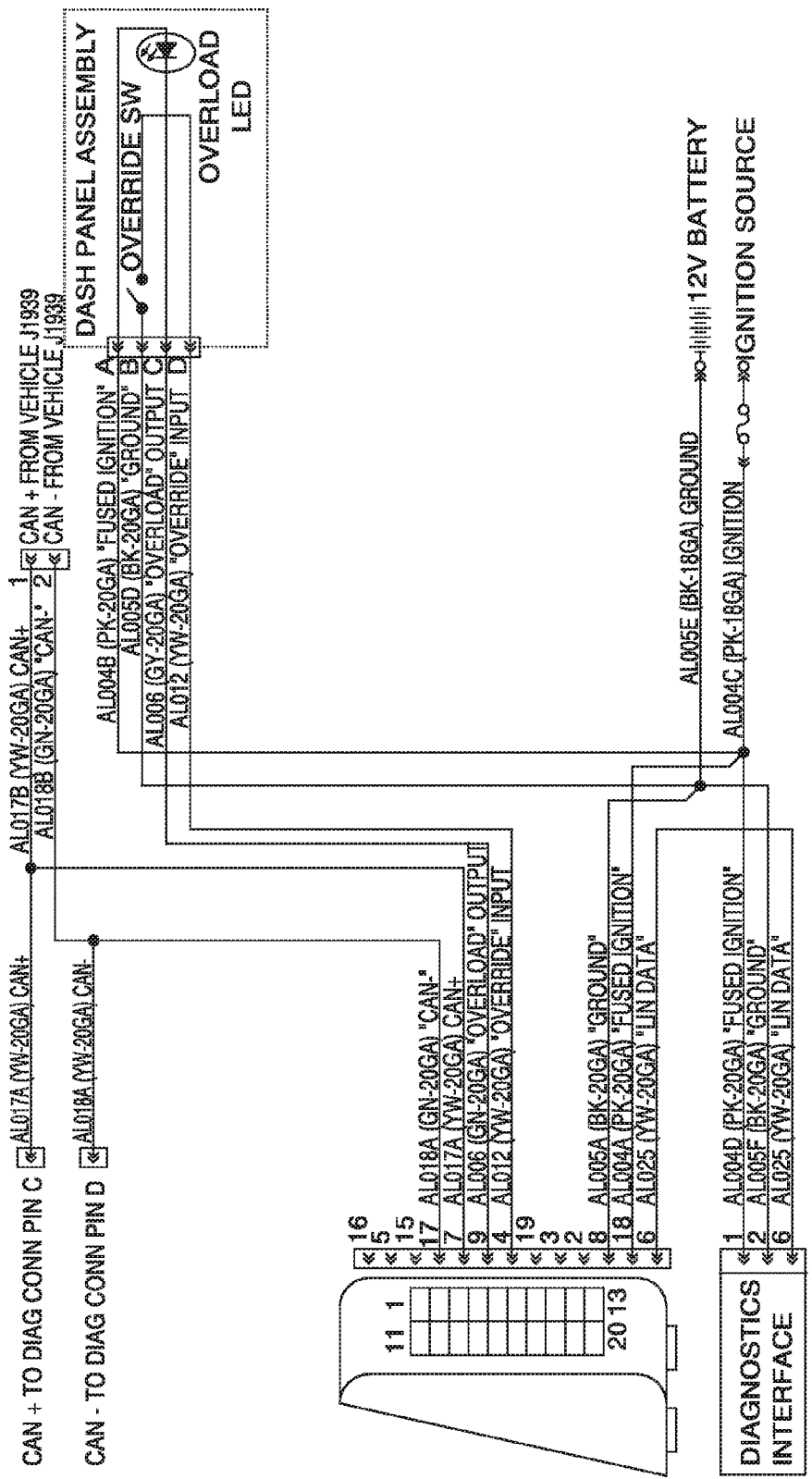
FIG. 3 is a schematic view of a portion of an electrical system of a traction control system according to the present disclosure.

FIGS. 2 and 3 schematically illustrate portions of exemplary pneumatic and electrical systems, respectively, of a traction control system that may be used to carry out the traction control routines and concepts described herein. In one embodiment, the traction control system utilizes an integrated electronic control unit (ECU) or automatic air suspension control system 22 and a 6-port valve body. The valve body manifold may be always pressurized by tank pressure (e.g., at 125 psi), with the pressure allowed to go to each control circuit being controlled by the amount of time a valve is held open. A preferred embodiment of the system monitors the air pressure in each of its control circuits and, if more pressure is desired, the valves are opened to allow more air in short bursts. Between each burst of full system pressure, the valve is closed and the pressure is measured again. The ECU 22 continually monitors and either adds or vents air as needed to maintain the proper pressure. Such a system may utilize solenoid valves and always operate at full system pressure, which may eliminate the varying hysteresis issue of a mechanical system.

When the non-driven rear axle is lightly loaded compared to the driven axle, its tires may not provide as much lateral stability as those on the driven rear axle. In situations involving a trailer attached to the vehicle 10, when the non-driven rear axle is in the tag position, during an evasive maneuver such as a double lane change to avoid something in the road, the loads imparted by the trailer through the fifth wheel will act to steer the vehicle. The effect will be that the driver will feel like "the tail is wagging the dog" (i.e., that the trailer is trying to steer the truck) and will be required to put further steering inputs to stabilize the vehicle 10. As this is not a normal feeling, an inexperienced driver could over-react, causing further problems. When the non-driven rear axle is in the pusher position, the fifth wheel is between the steer (i.e., front) and driven axles and as such, this phenomenon does not occur. This is a reason why it may be preferred for the traction control concepts described herein to be incorporated into a vehicle having a non-driven rear axle in the pusher position, because it allows the traction control system to work safely to bias load between the rear axles even at highway speeds without compromising vehicle dynamics. However, as stated above, it is also within the scope of the present disclosure for the non-driven rear axle to be in the tag position.

To further increase safety, the control logic of the traction control system and automatic air suspension control system is preferably fully automated, requiring no driver or technician intervention. It will always maintain the maximum available load (or at least a relatively high load) on the driven rear axle up to its legal limit and will automatically lift and deploy the non-driven rear axle (if provided as a liftable pusher axle) as needed to ensure Federal Bridge Law compliance. Regardless of the trailer loading, the system will adapt appropriately and never let the driven rear axle be overloaded due to operator error.

In one embodiment, when the combined load assigned to the two rear axles 14 and 16 is less than a preselected amount or level, there is no load placed on the non-driven rear axle. This may be preferred for embodiments in which the non-driven rear axle is liftable, in which case the non-driven rear axle will be in the lifted condition. While the non-driven rear axle is unloaded and in the lifted condition, the load on the driven rear axle is allowed to increase until it reaches a threshold amount or level or load. This portion of the traction control routine is represented by the $T_0$-$T_1$ time frame of FIG. 4.

Figure 4:
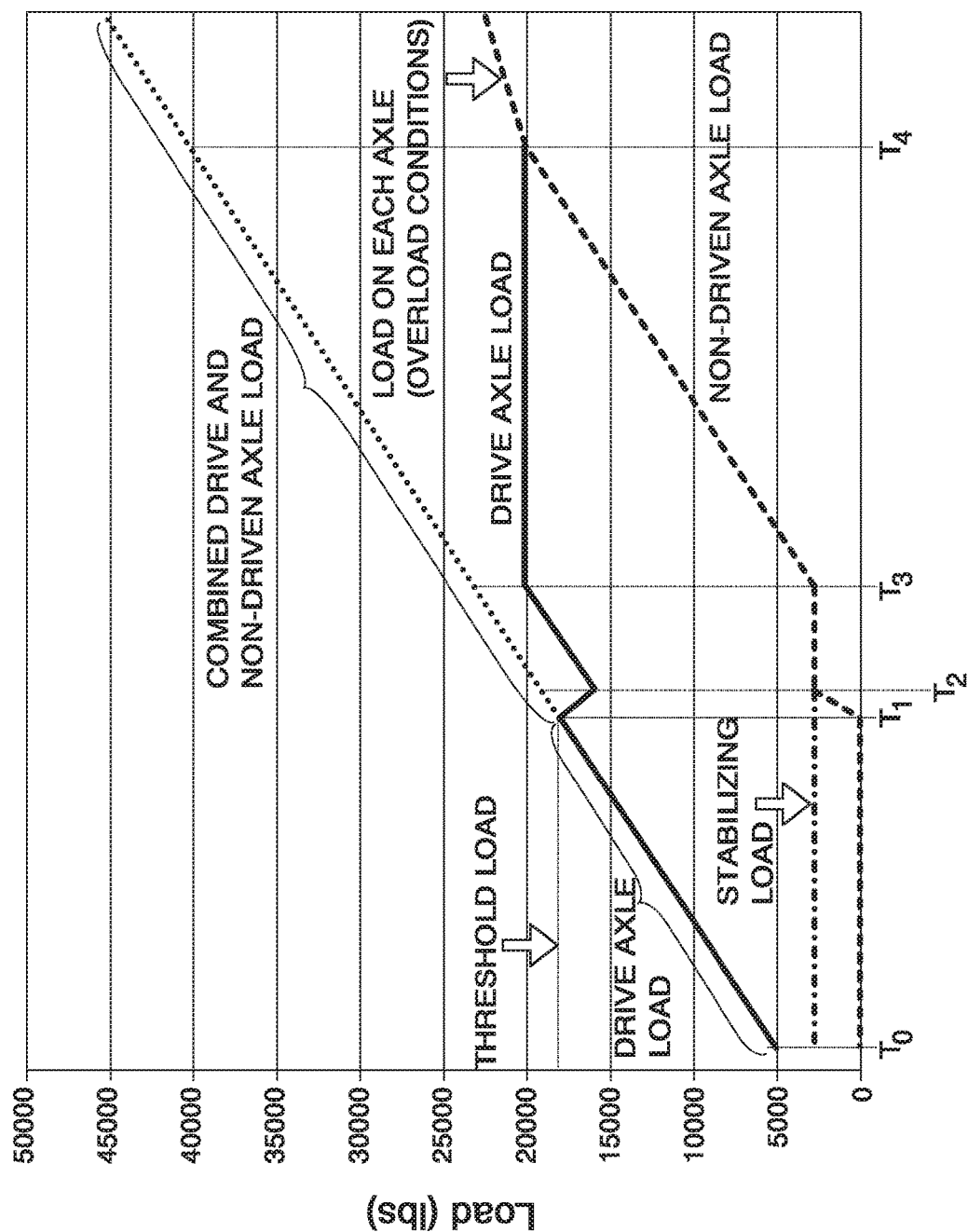
FIG. 4 is a graph representing an exemplary implementation of a traction control routine according to the present disclosure.

The threshold amount may be the maximum legal load that may be applied to the driven rear axle. For example, in one embodiment, it is legal for a load of up to 20,000 pounds to be applied to the driven rear axle, with a combined legal limit on the rear tandem axle of 40,000 pounds. In this case, the threshold amount may be 20,000 pounds, meaning that the non-driven rear axle will be maintained at a baseline load until the load applied to the driven rear axle by operation of the automatic air suspension control system 22 is approximately 20,000 pounds. In an alternative embodiment, which is shown in FIG. 4, the threshold amount or level or load is less than the maximum legal load that may be applied to the driven rear axle, such as a threshold amount of 17,000 pounds when the maximum legal load is 20,000 pounds. In such an embodiment, the non-driven rear axle will remain unloaded and in the lifted condition until the load applied to the driven rear axle by operation of the automatic air suspension control system 22 is approximately 17,000 pounds.

When the load on the driven rear axle reaches the threshold amount (represented in FIG. 4 as occurring at time $T_1$), the air suspension control system 22 may respond according to one of a variety of possible routines. FIG. 4 illustrates one exemplary routine, but it should be understood that other traction control routines may also be employed without departing from the scope of the present disclosure. For example, additional exemplary traction control routines are described and illustrated in U.S. Provisional Patent Application Ser. No. 61/779,140, the disclosure of which is incorporated herein by reference.

In the illustrated control routine, when the load on the driven rear axle reaches the threshold amount (illustrated as 17,000 pounds), the load applied to the driven rear axle decreases by action of the automatic air suspension control system, while the load applied to the non-driven rear axle is allowed to increase.

This is shown as occurring during the $T_1$-$T_2$ time frame. In the illustrated embodiment, the load on the non-driven rear axle is zero until $T_1$, with the non-driven rear axle being a liftable axle that is out of engagement with the ground until $T_1$, when the load applied to the driven rear axle reaches the threshold amount. At $T_1$, the automatic air suspension control system decreases the air pressure in the lift spring 24 to lower the non-driven rear axle into contact with the ground and allow it to carry a portion of the combined load assigned to the rear axle tandem. The load on the non-driven rear axle may be allowed to increase by any amount, but in a preferred embodiment, the load on the non-driven rear axle is allowed to increase until it reaches an amount that is sufficient to avoid "hop." In the illustrated embodiment, this "stabilizing amount" is approximately equal to 3,000 pounds, but the amount of load required to stabilize the non-driven rear axle may vary without departing from the scope of the present disclosure.

While the load on the non-driven rear axle is allowed to increase, the load on the driven rear axle decreases. In one embodiment, the rates at which the loads applied to the rear axles change during this stage are matched, such that an incremental increase in the load applied to the non-driven rear axle is balanced out by an equal incremental decrease in the load applied to the driven rear axle. In another embodiment, the rates at which the loads applied to the rear axles change are different, such that the combined load on the two rear axles may increase during this stage (i.e., when the load on the non-driven rear axle increases more than the decrease experienced by the driven axle). FIG. 4 shows this transitional stage as taking place over a $T_1$-$T_2$ time frame, which occupies a definite amount of time, but it should be understood that the control routine carried out during the $T_1$-$T_2$ time frame (and during any other time frame described herein) is not limited to any particular duration.

When the load applied to the non-driven rear axle has reached the stabilizing amount or load (at $T_2$ in FIG. 4), the load applied to the non-driven rear axle is maintained at the stabilizing load, as represented in FIG. 4 as taking place during the $T_2$-$T_3$ time frame. During this same time frame, the automatic air suspension control system 22 allows the load on the driven rear axle to increase. The load on the driven rear axle may increase at any rate and by any amount, but in the illustrated embodiment, the load on the driven rear axle is allowed to increase until it reaches the maximum legal limit.

When the load applied to the driven rear axle has reached a preselected level (illustrated in FIG. 4 as the maximum legal limit or 20,000 pounds), shown in FIG. 4 at $T_3$, the automatic air suspension control system 22 maintains the load on the driven rear axle at that level while allowing the load on the non-driven rear axle to increase. As shown in FIG. 4, the load on the non-driven rear axle is not brought up to the same level as the load on the driven rear axle until the maximum legal combined load (illustrated as 40,000 pounds) on the tandem is reached at $T_4$. When the loads on the rear axles have been equalized, any further load applied to the tandem (which will represent an overloaded condition) may be equally applied to the axles (represented to the right of $T_4$ in FIG. 4).

On account of the loads applied to the rear axles being significantly different at intermediate load levels, it may be preferred for the traction control system to include a brake control system that applies a brake control feature or brake pressure proportioning to the lightly loaded non-driven rear axle. Brake pressure proportioning may be implemented either through the control logic or with a commercially available load proportioning valve, such as a load sensing valve of the type manufactured by The Haldex Group of Stockholm, Sweden, to apply appropriate brake pressure to the lightly loaded non-driven rear axle to match its load so as to avoid locking it up during normal braking. Other control routines and variations to the control routine of FIG. 4 may also be employed without departing from the scope of the present disclosure. In one such variation, the traction control system includes one or more sensors configured to determine when wheel-slip occurs. When wheel-slip is detected, load may be temporarily shifted from the non-driven rear axle to the driven rear axle for improved traction. The amount of load that is transferred from the non-driven rear axle to the driven rear axle may vary, but may be anywhere from a percentage of the load on the non-driven rear axle to all of the load on the non-driven rear axle. In one embodiment, when all of the load on a liftable non-driven rear axle is transferred to the driven rear axle, the non-driven rear axle may be lifted off of the ground. When the traction control system determines that wheel-slip has ended, all or a portion of the load transferred from the non-driven rear axle to the driven rear axle may be shifted back to the non-driven rear axle. It is within the scope of the present disclosure for this wheel-slip response sub-routine to be performed at any speed, but it may be preferred to limit application of the sub-routine to wheel-slip that occurs under a pre-selected maximum speed.

If the vehicle 10 includes a dry freight van trailer or a refrigerated trailer, the trailer may have what is called a "slider," in which case the trailer axles are attached to a subframe that has the capability of being moved longitudinally relative to the remainder of the trailer. An exemplary slider is described in U.S. Pat. No. 7,207,593 to Saxon et al., which is incorporated herein by reference. In this case, the slider could be repositioned so that load is transferred from the two rear tractor axles 14 and 16 to the trailer axles. For example, if the rear tractor axles are carrying a combined 24,000 pound load and 4,000 pounds are transferred to the trailer axles, then the two truck axles would be carrying only 20,000 pounds (i.e., the legal limit that may be carried by the driven rear tractor axle in one example). According to the present disclosure, rather than equalizing the load on the rear tractor axles, all of the load on the rear tractor axles is transferred to the driven rear axle (loading it to the legal limit), thereby allowing the non-driven truck axle to be lifted off the ground if it is equipped with a lifting mechanism, which has a number of advantages. For example, fuel economy is improved due to the parasitic losses of the non-driven axle rear being eliminated. Recent testing by the inventors has shown that a 2% reduction in horsepower required at 65 MPH is achievable. Additionally, tire wear is improved because the slide forces experienced by the tires during turning are eliminated.

Preferably, the automatic air suspension control system 22 is programmed to prevent movement of the non-driven rear axle between the lifted and deployed conditions under certain circumstances. For example, the automatic air suspension control system 22 may be programmed to prevent movement of the non-driven rear axle between the lifted and deployed conditions when the parking brake 26 of the vehicle 10 (FIG. 2) is engaged. When the automatic air suspension control system 22 is so programmed, it makes two determinations—whether the rear axles are in a load condition in which the non-driven rear axle is to be moved between the lifted and deployed conditions (e.g., when the load on the tandem reaches or drops below the threshold hold) and whether the parking brake 26 is engaged. If the non-driven rear axle is to be moved between the lifted and deployed conditions and the parking brake 26 is disengaged, then the non-driven rear axle may be so moved. On the other hand, if the non-driven rear axle is to be moved between the lifted and deployed conditions and the parking brake 26 is engaged, then the air suspension control system 22 may prevent the non-driven rear axle from being deployed or retracted. A parking brake interlock may be advantageous for several reasons, such as by providing a safety feature. For example, if the vehicle 10 is stationary, with the parking brake 26 engaged, and is loaded or unloaded to the point that the traction control system would dictate for the non-driven rear axle to be either deployed or retracted, then the unexpected movement of the non-driven rear axle could harm a person who is in the vicinity of the non-driven rear axle (e.g., a mechanic servicing the vehicle 10 or a worker loading/unloading the vehicle 10).

It should be understood that loading the driven rear axle above the maximum legal limit without deploying the non-driven rear axle may be done without damaging the driven rear axle. The driven rear axle is capable of carrying a greater load than what is specified by the maximum legal limit, as the maximum legal limit takes into account the fact that the load experienced by the driven rear axle is a dynamic load that may be greater than the actual weighted load on the driven rear axle. For example, if the vehicle hits a pothole, then the vehicle (and, hence, the driven rear axle) will experience a G-force greater than 1, which multiplies the load experienced by the driven rear axle above the actual weighted load (on the order of double or triple the actual weighted load). On the other hand, a stationary vehicle will not experience a G-force greater than 1, meaning that the driven rear axle will not experience a load greater than the actual weighted load. Thus, the load experienced by an overloaded driven rear axle when the vehicle is stationary may be lower than the load experienced by a driven rear axle that is loaded below the maximum legal limit when the vehicle hits a pothole. Accordingly, a parking brake interlock of the type described herein will provide a safety feature without risking damage to the driven rear axle.

In a variation of a parking brake interlock, rather than preventing both retraction and deployment of the non-driven rear axle when the parking brake 26 is engaged, the parking brake interlock may prevent only retraction of the non-driven rear axle when the parking brake 26 is engaged, while allowing deployment of the non-driven rear axle. In yet another variation, rather than preventing either retraction or deployment of the non-driven rear axle when the parking brake 26 is engaged, the parking brake interlock may prevent only deployment of the non-driven rear axle when the parking brake 26 is engaged, while allowing retraction of the non-driven rear axle.

According to another approach, upon the automatic air suspension control system 22 determining that the parking brake 26 has become engaged, the automatic air suspension control system 22 may cause the non-driven rear axle to be moved between the deployed and lifted conditions without regard to whether the rear axles are in a load condition in which the non-driven rear axle is to be moved between the lifted and deployed conditions. For example, in one embodiment, the automatic air suspension control system 22 may be programmed to cause the non-driven rear axle to be moved from the lifted condition to the deployed condition (if not already in the deployed condition) when the automatic air suspension control system 22 determines that the parking brake 26 has been engaged, even if the rear axles are not subject to a load condition that would call for the non-driven rear axle to be moved to the deployed condition. This may be advantageous in that the vehicle 10 may be better supported and have improved traction while parked when the non-driven rear axle is deployed than when the non-driven rear axle is lifted. In another embodiment, the automatic air suspension control system 22 may be programmed to cause the non-driven rear axle to be moved from the deployed condition to the lifted condition (if not already in the lifted condition) when the automatic air suspension control system 22 has determined that the parking brake 26 has been engaged, even if the rear axles are not subject to a load condition that would call for the non-driven rear axle to be moved to the lifted condition. Either embodiment (automatic movement to the deployed condition or to the lifted condition) may be employed in combination with any of the parking brake interlocks described above. In particular, after automatically moving the non-driven rear axle to a particular condition (if not already in that condition at the time the parking brake 26 is engaged), the parking brake interlock may prevent any subsequent movement of the non-driven rear axle as long as the parking brake 26 remains engaged or may instead allow subsequent movement of the non-driven rear axle in only one direction as long as the parking brake 26 is engaged.

The automatic air suspension control system 22 may determine whether the parking brake 26 is engaged according to any suitable means or mechanism. For example, the air suspension 18 may include one or more sensors that determine whether the parking brake 26 is engaged or disengaged by examining the position of the parking brake 26 or measuring the air pressure in a parking brake pneumatic line. In another embodiment, the automatic air suspension control system 22 may coordinate with the electrical system of the traction control system (FIG. 3) to determine whether the parking brake 26 is engaged. For example, FIG. 3 shows an electrical system including a controller area network or "CAN," which is illustrated as lines 7 and 17 in FIG. 3. The CAN may transmit a variety of signals, including one or more signals that are indicative of the status of the parking brake 26 (i.e., whether it is engaged or not). The automatic air suspension control system 22 may be associated with the CAN such that a "parking brake engaged" signal transmitted by the CAN is received by the automatic air suspension control system 22. Upon receiving the "parking brake engaged" signal, the automatic air suspension control system 22 may take the appropriate actions, such as initiating a parking brake interlock or causing the non-driven rear axle to be moved to a particular condition (e.g., automatically moving the non-driven rear axle to the deployed condition upon the parking brake 26 being engaged). When the selected mechanism or mechanisms indicate that the parking brake 26 is no longer engaged, the automatic air suspension control system 22 may take the appropriate actions, such as ending the parking brake interlock.

A traction control system with a parking brake interlock may include an override or service function to selectively override the parking brake interlock. For example, if a mechanic is working on the vehicle 10 with the parking brake 26 engaged, it may be advantageous for the non-driven rear axle to be deployed or retracted for maintenance purposes. By flipping a switch or pressing a button or activating some other mechanism, the mechanic may override the parking brake interlock, thereby allowing or causing the non-driven rear axle to be deployed or retracted even with the parking brake 26 engaged.

In addition to a parking brake interlock, the traction control system may include other interlocks that prevent the deployment or retraction of the non-driven rear axle under certain circumstances. For example, the traction control system may include a speed-based interlock, which prevents the deployment or retraction (or deployment and retraction) of the non-driven rear axle when the vehicle is moving below or above a threshold speed. The traction control system may also or alternatively include an ignition interlock, which prevents deployment or retraction (or deployment and retraction) of the non-driven rear axle when the vehicle ignition is off. If the traction control system includes multiple interlocks, the automatic air suspension control system 22 may be programmed to determine the status of the interlocks (e.g., determining whether the vehicle ignition is on and the parking brake 26 is disengaged) either simultaneously or sequentially and using any suitable means.

Aspects of the present subject matter described above may be beneficial alone or in combination with one or more other aspects. Without limiting the foregoing description, in accordance with one aspect of the subject matter herein, there is provided an automatic air suspension control system for use in combination with a vehicle having a non-driven rear axle configured to be moved between a lifted condition and a deployed condition, a driven rear axle, a parking brake, and an air suspension associated with the rear axles to apply a load to each of the rear axles. The automatic air suspension control system is programmed to command the air suspension to apply load to one or both of the rear axles and to move the non-driven rear axle between the lifted and deployed conditions under selected load conditions. The automatic air suspension control system is also programmed to prevent movement of the non-driven rear axle from the lifted condition to the deployed condition when the parking brake is engaged or prevent movement of the non-driven rear axle from the deployed condition to the lifted condition when the parking brake is engaged.

In accordance with another aspect which may be used or combined with the preceding aspect, the automatic air suspension control system is programmed to command the air suspension to move the non-driven rear axle from the lifted condition to the deployed condition upon the parking brake becoming engaged if the non-driven rear axle is in the lifted condition and then prevent subsequent movement of the non-driven rear axle from the lifted condition to the deployed condition when the parking brake is engaged or prevent subsequent movement of the non-driven rear axle from the deployed condition to the lifted condition when the parking brake is engaged.

In accordance with another aspect which may be used or combined with any of the preceding aspects, the automatic air suspension control system is programmed to prevent movement of the non-driven rear axle from the lifted condition to the deployed condition when the parking brake is engaged and allow movement of the non-driven rear axle from the deployed condition to the lifted condition when the parking brake is engaged.

In accordance with another aspect which may be used or combined with the first or second aspects, the automatic air suspension control system is programmed to prevent movement of the non-driven rear axle from the deployed condition to the lifted condition when the parking brake is engaged and allow movement of the non-driven rear axle from the lifted condition to the deployed condition when the parking brake is engaged.

In accordance with another aspect which may be used or combined with the first or second aspects, the automatic air suspension control system is programmed to prevent movement of the non-driven rear axle from the lifted condition to the deployed condition when the parking brake is engaged and prevent movement of the non-driven rear axle from the deployed condition to the lifted condition when the parking brake is engaged.

In accordance with another aspect which may be used or combined with the any of the preceding aspects, there is provided an override function that, when executed, allows movement of the non-driven rear axle that would otherwise be prevented by the automatic air suspension control system when the parking brake is engaged.

In accordance with another aspect, there is provided a vehicle traction control system, which includes a non-driven rear axle configured to be moved between a lifted condition and a deployed condition. The system also includes a driven rear axle, a parking brake, an air suspension associated with the rear axles, and an automatic air suspension control system associated with the air suspension. The automatic air suspension control system is programmed to command the air suspension to apply load to one or both of the rear axles and to move the non-driven rear axle between the lifted and deployed conditions under selected load conditions. The automatic air suspension control system is also programmed to prevent movement of the non-driven rear axle from the lifted condition to the deployed condition when the parking brake is engaged or prevent movement of the non-driven rear axle from the deployed condition to the lifted condition when the parking brake is engaged.

In accordance with another aspect which may be used or combined with the preceding aspect, the automatic air suspension control system is programmed to command the air suspension to move the non-driven rear axle from the lifted condition to the deployed condition upon the parking brake becoming engaged if the non-driven rear axle is in the lifted condition and then prevent subsequent movement of the non-driven rear axle from the lifted condition to the deployed condition when the parking brake is engaged or prevent subsequent movement of the non-driven rear axle from the deployed condition to the lifted condition when the parking brake is engaged.

In accordance with another aspect which may be used or combined with any of the preceding two aspects, the automatic air suspension control system is programmed to prevent movement of the non-driven rear axle from the lifted condition to the deployed condition when the parking brake is engaged and allow movement of the non-driven rear axle from the deployed condition to the lifted condition when the parking brake is engaged.

In accordance with another aspect which may be used or combined with the seventh or eighth aspects, the automatic air suspension control system is programmed to prevent movement of the non-driven rear axle from the deployed condition to the lifted condition when the parking brake is engaged and allow movement of the non-driven rear axle from the lifted condition to the deployed condition when the parking brake is engaged.

In accordance with another aspect which may be used or combined with the seventh or eighth aspects, the automatic air suspension control system is programmed to prevent movement of the non-driven rear axle from the lifted condition to the deployed condition when the parking brake is engaged and prevent movement of the non-driven rear axle from the deployed condition to the lifted condition when the parking brake is engaged.

In accordance with another aspect which may be used or combined with the any of the preceding five aspects, a sensor is associated with the automatic air suspension control system and configured to determine whether the parking brake is engaged based at least in part on the position of the parking brake.

In accordance with another aspect which may be used or combined with the any of the seventh through eleventh aspects, a pneumatic line is associated with the parking brake. A sensor is associated with the automatic air suspension control system and the pneumatic line, with the sensor being configured to determine whether the parking brake is engaged based at least in part on air pressure in the pneumatic line.

In accordance with another aspect which may be used or combined with any of the seventh through eleventh aspects, a controller area network is associated with the automatic air suspension control system. The controller area network is configured to transmit a signal when the parking brake is engaged.

In accordance with another aspect which may be used or combined with the any of the preceding eight aspects, the automatic air suspension control system includes an override function that, when executed, allows movement of the non-driven rear axle that would otherwise be prevented by the automatic air suspension control system when the parking brake is engaged.

In accordance with another aspect, there is provided a method of controlling the traction of a vehicle having a non-driven rear axle configured to be moved between a lifted condition and a deployed condition, a driven rear axle, a parking brake, and an air suspension associated with the rear axles to apply a load to each of the rear axles. The method includes applying load to one or both of the rear axles via the air suspension and determining whether the rear axles are subject to a load condition under which the non-driven rear axle is to be moved from the lifted condition to the deployed condition. It is also determined whether the parking brake is engaged and, if the rear axles are subject to a load condition under which the non-driven axle is to be moved from the lifted condition to the deployed condition (and the parking brake is disengaged), the non-driven rear axle is moved from the lifted condition to the deployed condition. Otherwise, if the parking brake is engaged, movement of the non-driven rear axle from the lifted condition to the deployed condition is prevented.

In accordance with another aspect which may be used or combined with the preceding aspect, determining whether the parking brake is engaged includes moving the non-driven rear axle from the lifted condition to the deployed condition upon the parking brake becoming engaged if the non-driven rear axle is in the lifted condition.

In accordance with another aspect which may be used or combined with any of the preceding two aspects, the method includes determining whether the rear axles are subject to a load condition under which the non-driven rear axle is to be moved from the deployed condition to the lifted condition. If the rear axles are subject to a load condition under which the non-driven axle is to be moved from the deployed condition to the lifted condition, the non-driven rear axle is moved from the deployed condition to the lifted condition if the parking brake is disengaged. Otherwise, if the parking brake is engaged, movement of the non-driven rear axle from the deployed condition to the lifted condition is prevented.

In accordance with another aspect which may be used or combined with any of the preceding three aspects, determining whether the parking brake is engaged involves determining the position of the parking brake.

In accordance with another aspect which may be used or combined with any of the sixteenth through eighteenth aspects, determining whether the parking brake is engaged involves determining air pressure in a pneumatic line associated with the parking brake.

In accordance with another aspect which may be used or combined with any of the sixteenth through eighteenth aspects, determining whether the parking brake is engaged involves receiving a signal indicative of the status of the parking brake.

In accordance with another aspect which may be used or combined with any of the preceding six aspects, the prevention of movement of the non-driven rear axle from the lifted condition to the deployed condition may be overridden when the parking brake is engaged.

In accordance with another aspect, there is provided a method of controlling the traction of a vehicle having a non-driven rear axle configured to be moved between a lifted condition and a deployed condition, a driven rear axle, a parking brake, and an air suspension associated with the rear axles to apply a load to each of the rear axles. The method includes applying load to one or both of the rear axles via the air suspension and determining whether the rear axles are subject to a load condition under which the non-driven rear axle is to be moved from the deployed condition to the lifted condition. It is also determined whether the parking brake is engaged and, if the rear axles are subject to a load condition under which the non-driven axle is to be moved from the deployed condition to the lifted condition (and the parking brake is disengaged), the non-driven rear axle is moved from the deployed condition to the lifted condition. Otherwise, if the parking brake is engaged, movement of the non-driven rear axle from the deployed condition to the lifted condition is prevented.

In accordance with another aspect which may be used or combined with the preceding aspect, determining whether the parking brake is engaged includes moving the non-driven rear axle from the lifted condition to the deployed condition upon the parking brake becoming engaged if the non-driven rear axle is in the lifted condition.

In accordance with another aspect which may be used or combined with any of the preceding two aspects, determining whether the parking brake is engaged involves determining the position of the parking brake.

In accordance with another aspect which may be used or combined with the twenty-third or twenty-fourth aspects, determining whether the parking brake is engaged involves determining air pressure in a pneumatic line associated with the parking brake.

In accordance with another aspect which may be used or combined with the twenty-third or twenty-fourth aspects, determining whether the parking brake is engaged involves receiving a signal indicative of the status of the parking brake.

In accordance with another aspect which may be used or combined with any of the preceding five aspects, the prevention of movement of the non-driven rear axle from the deployed condition to the lifted condition may be overridden when the parking brake is engaged.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An automatic air suspension control system for use in combination with a vehicle having a non-driven rear axle configured to be moved between a lifted condition and a deployed condition, a driven rear axle, a parking brake, and an air suspension associated with the rear axles to apply a load to each of the rear axles, wherein the automatic air suspension control system is programmed to command the air suspension to apply load to one or both of the rear axles and to move the non-driven rear axle between the lifted and deployed conditions under selected load conditions, and prevent movement of the non-driven rear axle from the lifted condition to the deployed condition when the parking brake is engaged or prevent movement of the non-driven rear axle from the deployed condition to the lifted condition when the parking brake is engaged.

2. The automatic air suspension control system of claim 1, wherein the automatic air suspension control system is programmed to command the air suspension to move the non-driven rear axle from the lifted condition to the deployed condition upon the parking brake becoming engaged if the non-driven rear axle is in the lifted condition and then prevent subsequent movement of the non-driven rear axle from the lifted condition to the deployed condition when the parking brake is engaged or prevent subsequent movement of the non-driven rear axle from the deployed condition to the lifted condition when the parking brake is engaged.

3. The automatic air suspension control system of claim 1, wherein the automatic air suspension control system is programmed to prevent movement of the non-driven rear axle from the lifted condition to the deployed condition when the parking brake is engaged and allow movement of the non-driven rear axle from the deployed condition to the lifted condition when the parking brake is engaged.

4. The automatic air suspension control system of claim 1, wherein the automatic air suspension control system is programmed to prevent movement of the non-driven rear axle from the deployed condition to the lifted condition when the parking brake is engaged and allow movement of the non-driven rear axle from the lifted condition to the deployed condition when the parking brake is engaged.

5. The automatic air suspension control system of claim 1, wherein the automatic air suspension control system is programmed to prevent movement of the non-driven rear axle from the lifted condition to the deployed condition when the parking brake is engaged and prevent movement of the non-driven rear axle from the deployed condition to the lifted condition when the parking brake is engaged.

6. The automatic air suspension control system of claim 1, further comprising an override function that, when executed, allows movement of the non-driven rear axle that would otherwise be prevented by the automatic air suspension control system when the parking brake is engaged.

7. A vehicle traction control system, comprising:
a non-driven rear axle configured to be moved between a lifted condition and a deployed condition;
a driven rear axle;
a parking brake;
an air suspension associated with the rear axles; and
an automatic air suspension control system associated with the air suspension and programmed to
command the air suspension to apply load to one or both of the rear axles and to move the non-driven rear axle between the lifted and deployed conditions under selected load conditions, and
prevent movement of the non-driven rear axle from the lifted condition to the deployed condition when the parking brake is engaged or prevent movement of the non-driven rear axle from the deployed condition to the lifted condition when the parking brake is engaged.

8. The vehicle traction control system of claim 7, wherein the automatic air suspension control system is programmed to command the air suspension to move the non-driven rear axle from the lifted condition to the deployed condition upon the parking brake becoming engaged if the non-driven rear axle is in the lifted condition and then prevent subsequent movement of the non-driven rear axle from the lifted condition to the deployed condition when the parking brake is engaged or prevent subsequent movement of the non-driven rear axle from the deployed condition to the lifted condition when the parking brake is engaged.

9. The vehicle traction control system of claim 7, wherein the automatic air suspension control system is programmed to prevent movement of the non-driven rear axle from the lifted condition to the deployed condition when the parking brake is engaged and allow movement of the non-driven rear axle from the deployed condition to the lifted condition when the parking brake is engaged.

10. The vehicle traction control system of claim 7, wherein the automatic air suspension control system is programmed to prevent movement of the non-driven rear axle from the deployed condition to the lifted condition when the parking brake is engaged and allow movement of the non-driven rear axle from the lifted condition to the deployed condition when the parking brake is engaged.

11. The vehicle traction control system of claim 7, wherein the automatic air suspension control system is programmed to prevent movement of the non-driven rear axle from the lifted condition to the deployed condition when the parking brake is engaged and prevent movement of the non-driven rear axle from the deployed condition to the lifted condition when the parking brake is engaged.

12. The vehicle traction control system of claim 7, further comprising a sensor associated with the automatic air suspension control system and configured to determine whether the parking brake is engaged based at least in part on the position of the parking brake.

13. The vehicle traction control system of claim 7, further comprising
a pneumatic line associated with the parking brake, and
a sensor associated with the automatic air suspension control system and the pneumatic line, wherein the sensor is configured to determine whether the parking brake is engaged based at least in part on air pressure in the pneumatic line.

14. The vehicle traction control system of claim 7, further comprising a controller area network associated with the automatic air suspension control system and configured to transmit a signal when the parking brake is engaged.

15. The vehicle traction control system of claim 7, wherein the automatic air suspension control system includes an override function that, when executed, allows movement of the non-driven rear axle that would otherwise be prevented by the automatic air suspension control system when the parking brake is engaged.

16. A method of controlling the traction of a vehicle having a non-driven rear axle configured to be moved between a lifted condition and a deployed condition, a driven rear axle, a parking brake, and an air suspension associated with the rear axles to apply a load to each of the rear axles, the method comprising
applying load to one or both of the rear axles via the air suspension;
determining whether the rear axles are subject to a load condition under which the non-driven rear axle is to be moved from the lifted condition to the deployed condition or from the deployed condition to the lifted condition;
determining whether the parking brake is engaged; and
if the rear axles are subject to a load condition under which the non-driven rear axle is to be moved from the lifted condition to the deployed condition, moving the non-driven rear axle from the lifted condition to the deployed condition if the parking brake is disengaged and preventing movement of the non-driven rear axle from the lifted condition to the deployed condition if the parking brake is engaged or
if the rear axles are subject to a load condition under which the non-driven rear axle is to be moved from the deployed condition to the lifted condition, moving the non-driven rear axle from the deployed condition to the lifted condition if the parking brake is disengaged and preventing movement of the non-driven rear axle from the deployed condition to the lifted condition if the parking brake is engaged.

17. The method of claim 16, wherein said determining whether the parking brake is engaged includes moving the non-driven rear axle from the lifted condition to the deployed condition upon the parking brake becoming engaged if the non-driven rear axle is in the lifted condition.

18. The method of claim 16, further comprising
determining whether the rear axles are subject to a load condition under which the non-driven rear axle is to be moved from the deployed condition to the lifted condition, and
if the rear axles are subject to a load condition under which the non-driven rear axle is to be moved from the deployed condition to the lifted condition, moving the non-driven rear axle from the deployed condition to the lifted condition if the parking brake is disengaged and preventing movement of the non-driven rear axle from the deployed condition to the lifted condition if the parking brake is engaged.

19. The method of claim 16, wherein said determining whether the parking brake is engaged includes determining the position of the parking brake.

20. The method of claim 16, wherein said determining whether the parking brake is engaged includes determining air pressure in a pneumatic line associated with the parking brake.

21. The method of claim 16, wherein said determining whether the parking brake is engaged includes receiving a signal indicative of the status of the parking brake.

22. The method of claim 16, further comprising overriding the prevention of movement of the non-driven rear axle from the lifted condition to the deployed condition when the parking brake is engaged.

* * * * *